(12) United States Patent
Thomas et al.

(10) Patent No.: US 9,563,992 B2
(45) Date of Patent: Feb. 7, 2017

(54) SYSTEM AND METHOD OF ASSOCIATING, ASSIGNING, AND AUTHENTICATING USERS WITH PERSONAL PROTECTIVE EQUIPMENT USING BIOMETRICS

(71) Applicant: Honeywell International Inc., Morristown, NJ (US)

(72) Inventors: Tijo Thomas, Bangalore (IN); Kurian George, Bangalore (IN); Baba Vidyasagar Maddila, Bangalore (IN); Arunkumar Kamalakannan, Chennai (IN); Cyril Arokiaraj Arool Emmanuel, Bangalore (IN); Shashikant Gulaguli, Bangalore (IN); Nukala Sateesh Kumar, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 62 days.

(21) Appl. No.: 14/556,487

(22) Filed: Dec. 1, 2014

(65) Prior Publication Data
US 2016/0155279 A1 Jun. 2, 2016

(51) Int. Cl.
*G07C 9/00* (2006.01)

(52) U.S. Cl.
CPC ................... *G07C 9/00071* (2013.01)

(58) Field of Classification Search
CPC .......... G06F 21/32; G06F 21/83; G06F 21/34; G06F 21/35; G06F 21/31; G06F 21/36; G06F 2221/2101; G06F 2221/2111
USPC ........................................................ 340/5.52
See application file for complete search history.

(56) References Cited

U.S. PATENT DOCUMENTS

| | | | |
|---|---|---|---|
| 6,389,397 B1 | 5/2002 | Otto | |
| 7,549,161 B2 | 6/2009 | Poo et al. | |
| 7,793,109 B2 * | 9/2010 | Ortiz | H04L 63/0861 382/155 |
| 7,921,297 B2 * | 4/2011 | Ortiz | H04L 63/0861 713/182 |
| 8,000,502 B2 * | 8/2011 | Dave | G06F 21/32 340/521 |
| 8,412,949 B2 * | 4/2013 | Giobbi | G07C 9/00087 713/169 |
| 8,473,748 B2 * | 6/2013 | Sampas | G06Q 20/206 713/182 |
| 8,549,318 B2 * | 10/2013 | White | B60K 28/063 701/1 |
| 8,949,619 B2 * | 2/2015 | Parry | H04L 63/0861 713/185 |
| 9,053,310 B2 * | 6/2015 | Oberheide | G06F 21/32 |
| 9,141,951 B2 * | 9/2015 | McNeal | G06Q 20/042 235/380 |
| 2004/0220798 A1 | 11/2004 | Chi et al. | |

(Continued)

OTHER PUBLICATIONS

How to Plan for Workplace Emergencies and Evacuations, https://www.osha.gov/Publications/osha3088.html, Sep. 3, 2014.

*Primary Examiner* — Mark Blouin
(74) *Attorney, Agent, or Firm* — Conley Rose, P.C.; Kristin Jordan Harkins (57) ABSTRACT

A system and method of associating, assigning, and authenticating users with and to a personal protective equipment device is provided. A method can include receiving biometric data, processing the received biometric data, and based on the processing, associating a user with a personal protective equipment device.

20 Claims, 4 Drawing Sheets (56) References Cited

U.S. PATENT DOCUMENTS

| | | |
|---|---|---|
| 2005/0181337 A1 | 8/2005 | Shaw |
| 2007/0194938 A1 | 8/2007 | Mitchell |
| 2008/0091425 A1 | 4/2008 | Kane |
| 2008/0256613 A1 | 10/2008 | Grover |
| 2009/0234690 A1 | 9/2009 | Nikipelo |
| 2011/0288866 A1 | 11/2011 | Rasmussen |

* cited by examiner

SYSTEM AND METHOD OF ASSOCIATING, ASSIGNING, AND AUTHENTICATING USERS WITH PERSONAL PROTECTIVE EQUIPMENT USING BIOMETRICS

FIELD

The present invention relates generally to personal protective equipment devices, such as gas detectors. More particularly, the present invention relates to a system and method of associating, assigning, and authenticating users with and to personal protective equipment devices using biometrics.

BACKGROUND

In many environments, such as work sites or plants, workers can carry personal protective equipment (PPE) devices to ensure that they are safe. For example, the PPE devices can provide protection by detecting a threat and alerting the worker and/or a central monitoring station.

In use, a PPE device can be associated with and assigned to a user, for example, using the user's name and/or identification number. Accordingly, when a central monitoring station monitors the device, the details of the device, for example, the duration and amount of exposure to predetermined gases, can be associated with the user, and determinations can be made regarding the safety of the user. Such monitoring can be used in both live monitoring as well as in post incident analysis (PIA) to confirm that all individuals in a monitored region are safe.

For example, U.S. application Ser. No. 14/052,013 filed Oct. 11, 2013 and titled "System and Method to Monitor Events and Personnel Locations" and U.S. application Ser. No. 14/173,423 filed Feb. 5, 2014 and titled "System and Method for Location Tagged Headcount Accounting" describe and disclose systems and methods using PPE devices. U.S. application Ser. No. 14/052,013 and U.S. application Ser. No. 14/173,423 are assigned to the assignee hereof and are hereby incorporated by reference. However, neither U.S. application Ser. No. 14/052,013 nor U.S. application Ser. No. 14/173,423 describe or disclose systems and methods to ensure that the correct user is associated with and assigned to the correct PPE device.

Indeed, in some situations, the correct user is not associated with and assigned to a PPE device. For example, User A can work in a plant during a first shift and carry PPE Device A with him in the plant during the first shift. User A can provide input to PPE Device A to indicate that he is the user of the device, and a central monitoring station can be updated accordingly. User B can work in the plant during a second shift and carry PPE Device A with him in the plant during the second shift. However, User B may forget and/or choose not to update and/or provide input to PPE Device A to indicate that he is the user of the device. Accordingly, when User B carries PPE Device A with him in the plant during the second shift, PPE Device A and the central monitoring station may associate and assign the results of monitoring by PPE Device A with User A and/or the previous user of PPE Device A instead of with User B.

Problems can arise when the correct user is not associated with a PPE device. For example, during live monitoring, if a user association and assignment is incorrect, then an emergency response team may search for the incorrect user and possibly miss rescuing a user in need. Known systems and methods do not mandate that a user update and/or provide his information to a PPE device before using the PPE device. Indeed, any such personalization of the device is often difficult, especially while a user is wearing the PPE device or other PPE devices.

Updating and/or providing user information in known systems and methods is a manual process so even when a user does choose to update and/or provide his information to a PPE device, often the user must use a keypad or other user interface of the device to navigate through several pages of user names. Indeed, a user can only select a user name from a predetermined list of names, which is limited by the storage capacity of the device. That is, a user cannot dynamically associate himself with a PPE device if he is not included in the predetermined list of names, and adding the user to the predetermined list of names is often a time-intensive process that is prone to user error and/or tampering. Furthermore, known systems and methods do not protect the integrity of data collected from a user because known systems and methods do not prevent one user from selecting another user's name for association with the PPE device.

During PIA and/or any other historical analysis, problems that can arise when the correct user is not associated with a PPE device include problems with safety audits and problems with insurance claims. For example, during a safety audit, incorrect association of a user with a PPE device can result in failing the audit. Furthermore, when records at a central monitoring station do not associate the correct user with a PPE device during an incident, the correct user may have difficulty proving to an insurance company injuries that resulted while the user was carrying the PPE device.

In view of the above, there is a continuing, ongoing need for an improved system and method of associating, assigning, and authenticating users with and to a PPE device.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include a system and method of associating, assigning, and authenticating users with and to a PPE device. For example, in some embodiments, systems and methods disclosed herein can automatically associate and assign a user with and to a PPE device based on received biometric data and information, for example, voice biometric data, a fingerprint, and/or user access card information provided and/or input to the PPE device. Indeed, when the correct user is associated with and assigned to a PPE device, data collected by the PPE device can be correctly analyzed with respect to the user for safety, regulatory, and insurance needs.

According to some embodiments disclosed herein, upon occurrence of a predetermined event, a PPE device can request and/or mandate that the user of the device input his biometric data and information. For example, the predetermined event can include startup of the PPE device, the PPE device receiving user input selecting a predetermined option from a menu displayed on the device, a new user logging into the PPE device, and/or removal of the PPE device from a docking station or charging station.

To solicit the user input of the biometric data and information, in some embodiments, the PPE device can emit a notification to the user via an audible or visual indicator associated with the device and/or can display a message to the user on a user interface of the device. Upon receipt, the received biometric data and information can be processed locally, by the PPE device, and/or remotely, by a central monitoring station and/or server communicating with the PPE device, to identify a user associated with the received biometric data and information.

Processing the biometric data and information can result in a successful or failed identification. For example, when systems and methods disclosed herein process the received biometric data and information to successfully identify the user associated with the biometric data and information, a user interface of the PPE device can display a confirmation message to confirm the identification, and upon acceptance by the user, systems and methods disclosed herein can associate and assign the user associated with the biometric data and information with and to the PPE device and, in some embodiments, can personalize settings of the PPE device to settings associated with the assigned user. However, when systems and methods disclosed herein fail to successfully identify a user associated with the biometric data and information or the user fails to confirm an identification made by systems and methods disclosed herein, systems and methods disclosed herein can associate and assign an "unknown" user with the PPE device, and the PPE device can proceed to normal operation without any personalized settings.

Some embodiments disclosed herein can include one or more PPE devices, one or more central monitoring stations, and/or one or more servers. For example, in some embodiments, the PPE device and/or a central monitoring station can include a user interface to receive biometric data and information, a processor to process the received biometric data and information, and a database and/or memory device to store user information for identifying and/or cross-referencing a user based on biometric data. The server can include a local server that can communicate with PPE devices via a local network and/or a remote server that can communicate with PPE devices via a cloud network. In any embodiment, the server can include a processor to process the received biometric data and information and a database and/or memory device to store user information for identifying and/or cross-referencing a user based on biometric data.

It is to be understood that PPE devices disclosed herein can include, but are not limited to, gas detectors. However, PPE devices disclosed herein can include any PPE device as would be known by those of skill in the art.

In some embodiments, the database and/or memory device can be updated periodically and/or as needed to add additional biometric data and information and user information to the database. Thus, systems and methods disclosed herein can be dynamic so that new users can be associated with and assigned to PPE devices disclosed herein.

Figure 1:
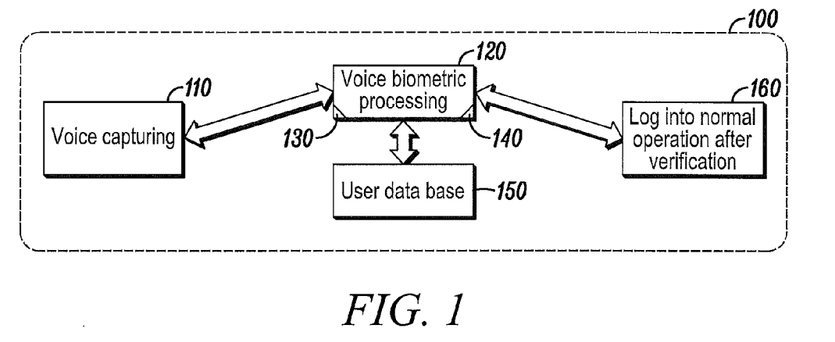
FIG. 1 is a block diagram of a personal protective equipment device in accordance with disclosed embodiments.

FIG. 1 is a block diagram of a PPE device 100 in accordance with disclosed embodiments. It is to be understood that in addition to the elements shown and described herein, the PPE device 100 and other PPE devices disclosed herein can include other elements as known to be included in PPE devices known in the art, for example, a sensor and the like.

As seen in FIG. 1, the device 100 can include a user interface 110 for receiving biometric data and information. For example, when the biometric data and information includes voice biometric data, the user interface 110 can include a microphone. In some embodiments, the voice biometric data can include voice data of a user saying a predetermined phrase, for example, his user identification number.

The user interface 110 can be in communication with control circuitry 120 that includes one or more programmable processors 130 and executable control software 140 as would be understood by one of ordinary skill in the art. The executable control software 140 can be stored on a transitory or non-transitory computer readable medium, including, but not limited to, local computer memory, RAM, optical storage media, magnetic storage media, flash memory, and the like.

The control circuitry 120, the processor 130, and the control software 140 can process the biometric data and information received by the user interface 110 to identify a user associated with the received biometric data and information. For example, in some embodiments, the control circuitry 120, the processor 130, and the control software 140 can access a local database 150 to cross-reference the received biometric data with biometric data and information and associated user information stored in the database 150. In some embodiments, when the control circuitry 120, the processor 130, and the control software 140 successfully identify a user, the device 100 can personalize settings of the device 100 to settings associated with the assigned user and proceed to normal operation, shown schematically as in 160.

Figure 2:
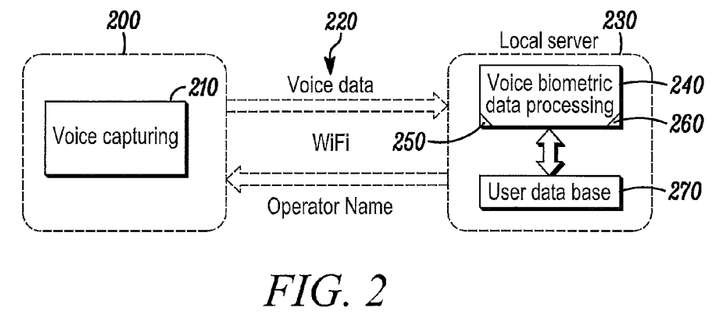
FIG. 2 is a block diagram of a personal protective equipment device in communication with a local server in accordance with disclosed embodiments.

FIG. 2 is a block diagram of a PPE device 200 in communication with a local server 230 in accordance with disclosed embodiments. As seen in FIG. 2, the PPE device 200 can include a user interface 210 for receiving biometric data and information and can communicate with the local server 230 via a local network 220, for example, a WiFi network. In some embodiments, the PPE device 200 can transmit the received biometric data and information to the local server 230 via the local network 220, and the local server 230 can process the received biometric data. Furthermore, in some embodiments, the local server 230 can be part of and/or be associated with a central monitoring station.

For example, the local server 230 can include control circuitry 240 that includes one or more programmable processors 250 and executable control software 260 as would be understood by one of ordinary skill in the art. The executable control software 260 can be stored on a transitory or non-transitory computer readable medium, including, but not limited to, local computer memory, RAM, optical storage media, magnetic storage media, flash memory, and the like.

The control circuitry 240, the processor 250, and the control software 260 can process the biometric data and information received from the PPE device 200 to identify a user associated with the received biometric data and information. For example, in some embodiments, the control circuitry 240, the processor 250, and the control software 260 can access a local database 270 to cross-reference the received biometric data with biometric data and information and associated user information stored in the database 270. Then, the server 230 can transmit the identified user information, for example, the user's name, to the PPE device 200 via the local network 220 so that the device 200 can associate the user information with the received biometric data and information. In some embodiments, settings of the PPE device 200 can be personalized to settings associated with the assigned user.

Figure 3:
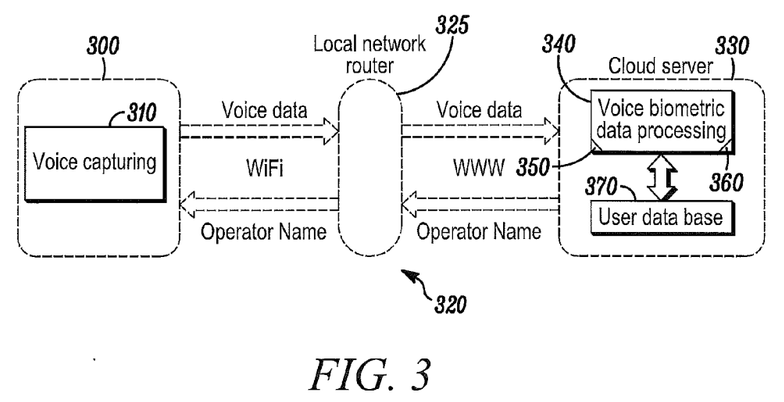
FIG. 3 is a block diagram of a personal protective equipment device in communication with a remote cloud server in accordance with disclosed embodiments.

FIG. 3 is a block diagram of a PPE device 300 in communication with a remote cloud server 330 in accordance with disclosed embodiments. As seen in FIG. 3, the PPE device 300 can include a user interface 310 for receiving biometric data and information and can communicate with the remote cloud server 330 via a cloud network 320, for example, a local WiFi network connected to the Internet via a network router 325. In some embodiments, the PPE device 300 can transmit the received biometric data and information to the remote cloud server 330 via the cloud network 320, and the cloud server 330 can process the received biometric data. Furthermore, in some embodiments, the cloud server 330 can be part of and/or be associated with a central monitoring station.

For example, the cloud server 330 can include control circuitry 340 that includes one or more programmable processors 350 and executable control software 360 as would be understood by one of ordinary skill in the art. The executable control software 360 can be stored on a transitory or non-transitory computer readable medium, including, but not limited to, local computer memory, RAM, optical storage media, magnetic storage media, flash memory, and the like.

The control circuitry 340, the processor 350, and the control software 360 can process the biometric data and information received from the PPE device 300 to identify a user associated with the received biometric data and information. For example, in some embodiments, the control circuitry 340, the processor 350, and the control software 360 can access a local database 370 to cross-reference the received biometric data with biometric data and information and user information stored in the database 370. Then, the server 330 can transmit the identified user information, for example, the user's name, to the PPE device 300 via the cloud network 320 so that the device 300 can associate the user information with the received biometric data and information. In some embodiments, settings of the PPE device 300 can be personalized to settings associated with the assigned user.

Figure 4:
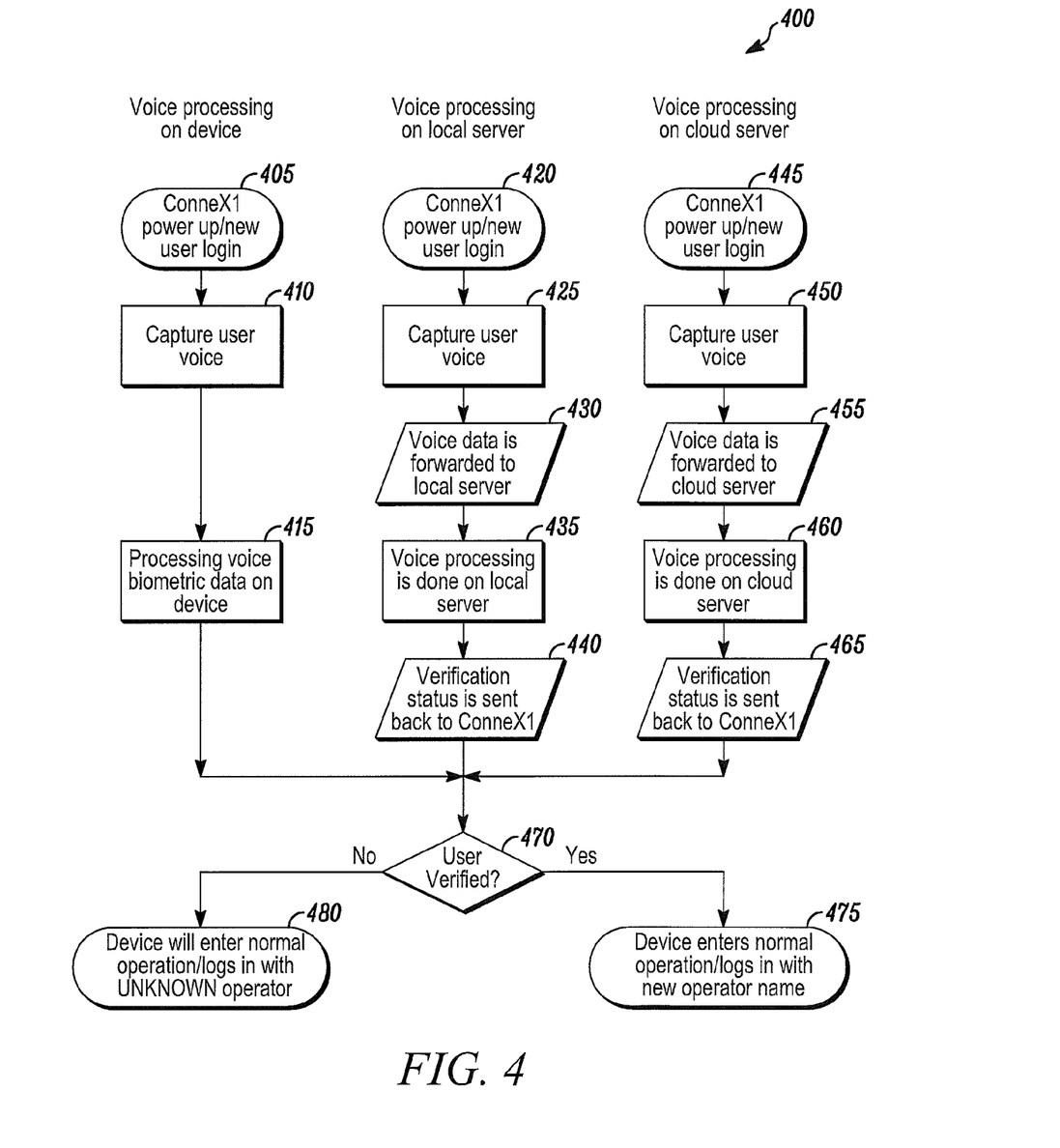
FIG. 4 is a flow diagram of a method in accordance with disclosed embodiments.

FIG. 4 is a flow diagram of a method 400 in accordance with disclosed embodiments. In some embodiments, a PPE device 100, 200, or 300 and/or a server 230 or 330 can execute and control the method 400 and others in accordance with disclosed embodiments.

For example, as seen in FIG. 4, biometric data and information processing can be executed on a PPE device, on a local server, and/or on a cloud server. When executed on a PPE device, upon occurrence of a predetermined event as in 405, the method 400 can include the PPE device receiving biometric data and information from a user as in 410, and the PPE device processing the received biometric data as in 415. When biometric data and information processing is executed on a local server, upon occurrence of a predetermined event as in 420, the method 400 can include the PPE device receiving biometric data and information from a user as in 425, the PPE device transmitting the received biometric data and information to a local server as in 430, the local server processing the received biometric data as in 435, and the local server transmitting information related to user verification to the PPE device as in 440. When biometric data and information processing is executed on a cloud server, upon occurrence of a predetermined event as in 445, the method 400 can include the PPE device receiving biometric data and information from a user as in 450, the PPE device transmitting the received biometric data and information to a cloud server as in 455, the cloud server processing the received biometric data as in 460, and the cloud server transmitting information related to user verification to the PPE device as in 465.

After the PPE device processes the received biometric data as in 415, the local server transmits information related to user verification to the PPE device as in 440, or the cloud server transmits information related to user verification to the PPE device as in 465, the method 400 can determine whether a user has been verified as in 470. That is, the method 400 can determine whether the received biometric data and information has been successfully associated with a user and/or user information. If so, then the method 400 can include the PPE device entering normal operation while associating events occurring during such normal operation with the associated user as in 475. In some embodiments, the PPE device entering normal operation can include personalizing settings of the PPE device to settings associated with the associated user.

However, if the method 400 determines that the received biometric data and information has not been successfully associated with a user and/or user information, then the method 400 can include the PPE device entering normal operation while associating events occurring during such normal operation with an unknown user as in 480. That is, even when systems and methods disclosed herein cannot successfully associate received biometric data and information with a user and/or user information, in some embodiments, the PPE device can still proceed to normal operation and is not disabled from further use.

Figure 5:
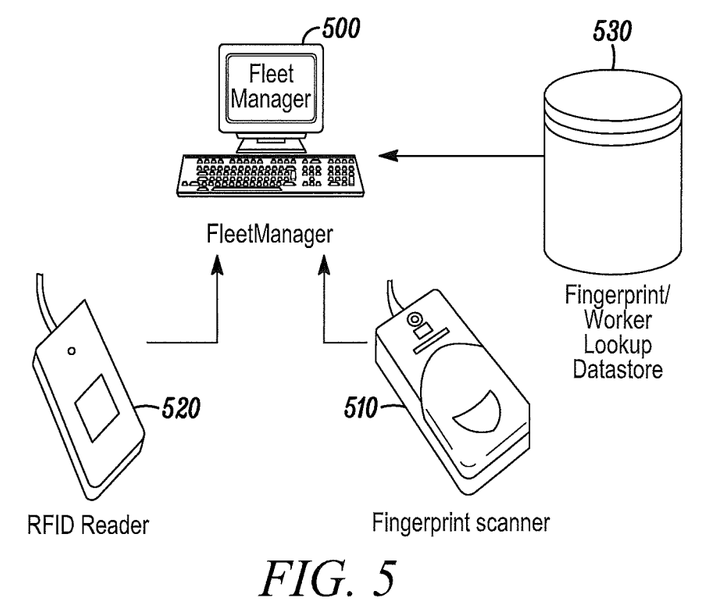
FIG. 5 is a schematic diagram of a central monitoring station in accordance with disclosed embodiments.

FIG. 5 is a schematic diagram of a central monitoring station 500 in accordance with disclosed embodiments. As seen in FIG. 5, the central monitoring station 500 can include a fleet manager, docking station, charging station, and/or other personal computer as would be known by those of skill in the art. The central monitoring station 500 can also include a first user interface 510 for receiving biometric data and information and a second user interface 520 for receiving PPE device information. For example, when the biometric data and information includes a fingerprint, the first user interface 510 can include a fingerprint scanner. Similarly, when the PPE device information includes information in a RFID or bar code on the device, the second user interface 520 can include an RFID reader.

Biometric data and information for all potential device users can be input into the first user interface 510 and stored in a database 530 that can be local to and/or remote from the central monitoring station 500. Furthermore, as new potential users are identified, biometric data and information for each new potential user can be input into the first user interface 510 and stored in the database 530 to dynamically update the database 530 accordingly. In some embodiments, additional information for each user, such as the user's name, category, position, and the like, can be stored with the user's biometric data and information in the database 530, and in some embodiments, serial numbers for all known PPE devices can be stored in the database 530.

To associate and assign a particular user to a particular PPE device, the particular PPE device information can be input into the second user interface 520, and biometric data and information for the particular user can be input into the first user interface 510. Then, the central monitoring station 500 can access the database 530 to cross-reference the particular user's received biometric data with stored biometric data and associated user information and assign the associated user information to the particular PPE device.

Figure 6:
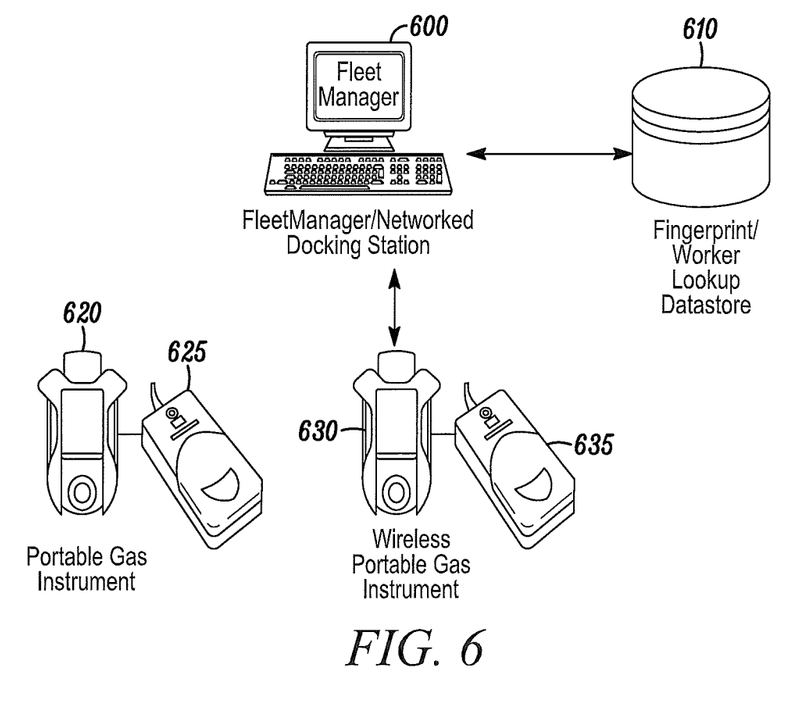
FIG. 6 is a schematic diagram of a central monitoring station in communication with personal protective equipment devices in accordance with disclosed embodiments.

FIG. 6 is a schematic diagram of a central monitoring station 600 in communication with PPE devices in accordance with disclosed embodiments. As explained above, the central monitoring station 600 can include a fleet manager, docking station, charging station, and/or other personal computer as would be known by those of skill in the art. Furthermore, the central monitoring station 600 can include a first user interface for receiving biometric data and information and a second user interface for receiving PPE device information.

Biometric data and information for all potential device users can be input into the first user interface and stored in a database 610 that can be local to and/or remote from the central monitoring station 600. Furthermore, as new potential users are identified, biometric data and information for each new potential user can be input into the first user interface and stored in the database 610 to dynamically update the database 610 accordingly. In some embodiments, additional information for each user, such as the user's name, category, position, and the like, can be stored with the user's biometric data and information in the database 610.

PPE devices 620, 630 can communicate with the central monitoring station 600, and each PPE device 620, 630 can include a user interface 625, 635, respectively, for receiving biometric data and information.

In some embodiments, PPE device 620 can connect with the central monitoring station 620, and biometric data and associated user information stored in the database 610 can be downloaded onto the PPE device 620. To associate and assign a particular user with and to PPE device 620, biometric data and information for the particular user can be input into the user interface 625, and the PPE device 620 can access the biometric data and user information stored thereon to cross-reference the particular user's received biometric data with stored biometric data and associated user information. If the PPE device 620 can match the received biometric data with stored biometric data, then the PPE device 620 can associate and assign the user information associated with the biometric data with and to the PPE device 620. In some embodiments, the PPE device 620 can proceed to normal operation only when the PPE device 620 is able to make such an association and assignment.

In some embodiments, PPE device 630 can be in wireless communication with the central monitoring station 620. To associate and assign a particular user with and to PPE device 630, biometric data and information for the particular user can be input into the user interface 635, and the PPE device 630 can communicate with the central monitoring station 600 to access biometric data and associated user information stored in the database 610 to cross-reference the particular user's received biometric data with stored biometric data and associated user information. If the PPE device 630 and/or the central monitoring station 600 can match the received biometric data with stored biometric data, then the PPE device 620 and/or the central monitoring station 600 can associate and assign the user information associated with the biometric data with and to the PPE device 630. In some embodiments, the PPE device 630 can proceed to normal operation only when the PPE device 630 is able to make such an association and assignment.

Figure 7A:
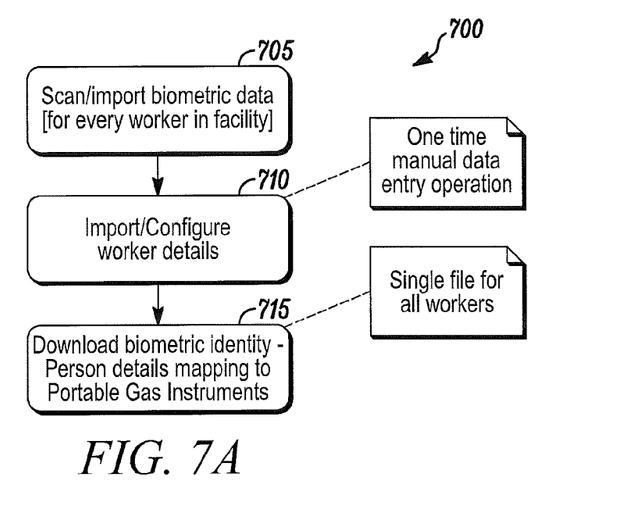
FIG. 7A is a flow diagram of a method in accordance with disclosed embodiments.
Figure 7B:
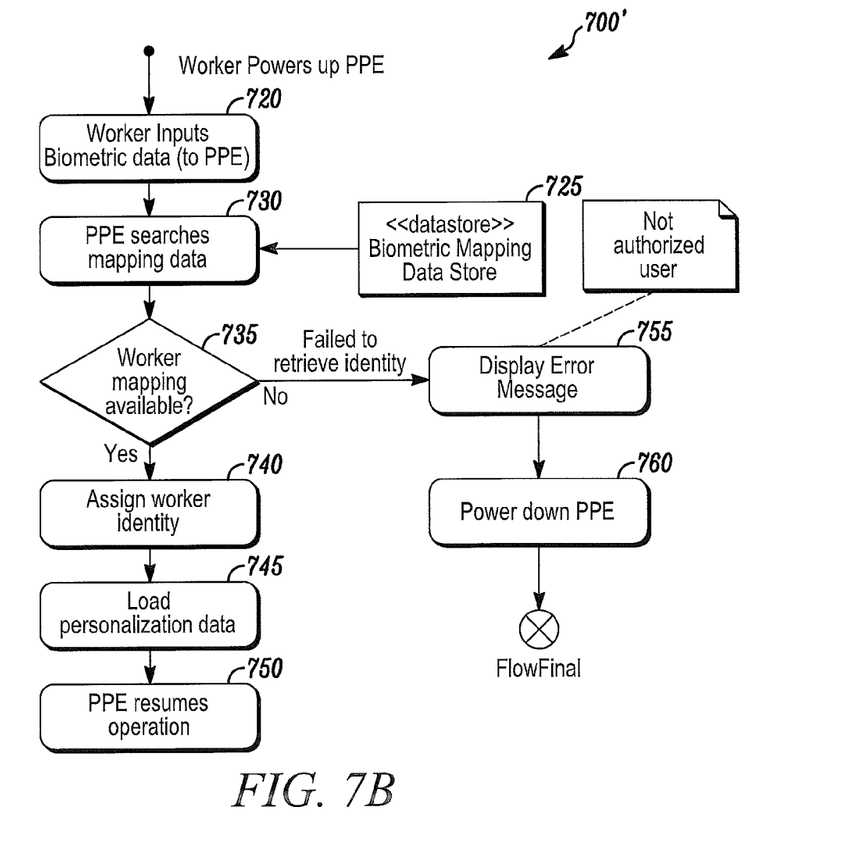
FIG. 7B is a flow diagram of a method in accordance with disclosed embodiments.

FIGS. 7A and 7B are flow diagrams of methods 700, 700' in accordance with disclosed embodiments. In some embodiments, a central monitoring station 500, 600 and/or a PPE device 620, 630 can execute and control the methods 700, 700' and others in accordance with disclosed embodiments.

For example, as seen in FIG. 7A, biometric data and information for all potential device users can be received and stored in a database as in 705. Then, additional information for each potential device user can be received and stored in the database and associated with respective stored biometric data and information as in 710. In some embodiments, the additional information for each potential device user can be manually entered and need only be entered once. Finally, in some embodiments, the received biometric data and additional information for all potential device users can be downloaded from the database onto a PPE device as in 715. In some embodiments, a single file that includes such information can be downloaded to the PPE device.

As seen in FIG. 7B, upon occurrence of a predetermined event, such as powering on a PPE device, a PPE device can receive a user's biometric data as in 720. Then, the PPE device can access stored biometric data and additional user information 725, either locally on the PPE device or remotely in a database, as in 730, and determine whether the received biometric data matches biometric data in the stored information 725 as in 735. If so, then the PPE device can associate and assign the user information associated with the biometric data with and to the PPE device as in 740, load any personalized data for the assigned user onto the PPE device as in 745, and proceed to normal operation as in 750. However, if the PPE device determines that the received biometric data fails to match biometric data in the stored information 725 as in 735, then the PPE device can display an error message as in 755 and cease any normal operation as in 760.

In accordance with embodiments described above, systems and methods disclosed herein can also include a PPE device receiving biometric data, such as voice biometric data that includes a voice command, and the PPE device and/or a central monitoring station processing the command to change a setting, mode, or profile of the PPE device in accordance with the command. In some embodiments, the settings, modes, and/or profiles to which the PPE device can be changed can be pre-configured, and in some embodiments, the settings, modes, and/or profiles to which the PPE device can be changed can be associated with a user issuing the command. Accordingly, the PPE device and the operation thereof can be personalized for a particular user that is using the PPE device.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
   receiving biometric data via a personal protective equipment device, wherein the personal protective equipment device comprises a gas detector;
   processing the received biometric data, wherein processing the received biometric data identifies a user associated with user information stored in non-transitory memory; and
   based on the processing, associating, by the personal protective equipment, the user information with the personal protective equipment device, wherein the personal protective equipment is configured to collect data via the gas detector and analyze the collected data with respect to the user.

2. The method of claim 1 further comprising, upon occurrence of a predetermined event, soliciting input of the biometric data.

3. The method of claim 1 wherein processing the received biometric data includes locally processing the received biometric data.

4. The method of claim 1 wherein processing the received biometric data includes transmitting at least a portion of the received biometric data to a remote location for remote processing.

5. The method of claim 1 further comprising adjusting, by the personal protective equipment device, at least one setting of the personal protective equipment device to a personalized setting associated with the user in response to associating the user information with the personal protective equipment device.

6. The method of claim 1 wherein the user is an unknown user.

7. The method of claim 1 wherein processing the received biometric data includes identifying the user based on the received biometric data.

8. The method of claim 7 wherein identifying the user based on the received biometric data includes cross-referencing the received biometric data with biometric data and associated user information stored in a memory device.

9. The method of claim 8 further comprising updating the memory device with second biometric data and second associated user information.

10. A system comprising:
    a personal protective equipment device comprising:
       a gas detector;
       a user interface;
       a programmable processor; and
       executable control software stored on a non-transitory computer readable medium that upon execution by the programmable processor,
          receives biometric data via the user interface,
          when the user interface receives biometric data, the programmable processor and the executable control software process the received biometric data so as to identify a user associated with user information stored in non-transitory computer readable medium, and
          based on the processing, associate the user information with the personal protective equipment device that is configured to collect data;
          collect data via the gas detector and associate the collected data with respect to the user information associated with the user.

11. The system of claim 10 wherein the user interface includes at least one of a microphone and a fingerprint scanner.

12. The system of claim 10 further comprising a memory device, wherein the programmable processor and the executable control software associating the user with the system includes the programmable processor and the executable control software cross-referencing the received biometric data with biometric data and associated user information stored in the memory device.

13. The system of claim 12 wherein the user interface receives second biometric data and second associated user information, and wherein the programmable processor and the executable control software update the memory device with the second biometric data and the second associated user information.

14. The system of claim 10 wherein the programmable processor and the executable control software adjust at least one setting of the system to a personalized setting associated with the user.

15. A system comprising:
    a personal protective equipment device comprising:
       a gas detector;
       a user interface;
       a transceiver configured to communicatively coupled the personal protective equipment device with a central monitoring station at a remote location;
       a programmable processor; and
       executable control software stored on a non-transitory computer readable medium that upon execution by the programmable processor,
          receives biometric data on the personal protective equipment device,
          when the user interface receives the biometric data, the transceiver transmits the received biometric data to the central monitoring station at the remote location for processing and, responsive thereto, receives authentication data,
          responsive to reception of the authentication data, the programmable processor and the executable control software associate the authentication data with the personal protective equipment device that is configured to collect data, and
          collect data via the gas detector and analyze the collected data with respect to the user information associated with the user.

16. The system of claim 15 wherein the user interface includes at least one of a microphone and a fingerprint scanner.

17. The system of claim 15 wherein the transceiver transmits and receives the biometric data and the authentication data to and from, respectively, at least one of a server, a database, and a central monitoring station.

18. The system of claim 15 wherein the transceiver receiving the authentication data includes the transceiver receiving user information associated with the received biometric data.

19. The system of claim 15, wherein the programmable processor, upon configuration by the executable control software stored on the non-transitory computer readable medium, adjusts at least one setting of the personal protective equipment device to a personalized setting associated with the user.

20. The system of claim 19 wherein the programmable processor and the executable control software adjust at least one setting of the system to a personalized setting associated with the authentication data.

* * * * *

UNITED STATES PATENT AND TRADEMARK OFFICE
CERTIFICATE OF CORRECTION

PATENT NO. : 9,563,992 B2
APPLICATION NO. : 14/556487
DATED : February 7, 2017
INVENTOR(S) : Tijo Thomas et al.

It is certified that error appears in the above-identified patent and that said Letters Patent is hereby corrected as shown below:

Column 10, Line 39: "that upon" should be "that, upon"

Signed and Sealed this
Twenty-fourth Day of October, 2017

Joseph Matal
*Performing the Functions and Duties of the
Under Secretary of Commerce for Intellectual Property and
Director of the United States Patent and Trademark Office*